United States Patent [19]
Gelardi et al.

[11] Patent Number: 5,086,932
[45] Date of Patent: Feb. 11, 1992

[54] RACK PACKAGE

[75] Inventors: Paul J. Gelardi, P.O. Box 127, Cape Porpoise, Me. 04014; John A. Gelardi, Cape Porpoise, Me.

[73] Assignee: Paul J. Gelardi, Kennebunkport, Me.

[21] Appl. No.: 617,384

[22] Filed: Nov. 26, 1990

Related U.S. Application Data

[63] Continuation of Ser. No. 417,633, Oct. 5, 1989, abandoned.

[51] Int. Cl.⁵ ............................................. A47F 7/00
[52] U.S. Cl. ............................... 211/40; 211/41; 206/387
[58] Field of Search ............... 211/40, 41, 71, 4; 206/307, 309, 425; 312/813

[56] References Cited

U.S. PATENT DOCUMENTS

| | | |
|---|---|---|
| 3,716,145 | 7/1973 | Guitierrez . |
| 3,756,383 | 9/1973 | Kryter . |
| 3,897,871 | 8/1975 | Zinnbauer . |
| 4,316,539 | 2/1982 | Torrington . |
| 4,381,836 | 5/1983 | Rivkin et al. . |
| 4,518,085 | 6/1985 | Chisholm et al. . |
| 4,523,680 | 6/1985 | Saito et al. . |
| 4,558,782 | 12/1985 | Iverson et al. . |
| 4,567,983 | 2/1986 | Morris . |
| 4,627,532 | 12/1986 | Clemens . |
| 4,627,535 | 12/1986 | Kirchner et al. . |
| 4,629,067 | 12/1986 | Paulik et al. . |
| 4,634,004 | 1/1987 | Mortensen . |
| 4,657,146 | 4/1987 | Walters . |
| 4,712,679 | 12/1987 | Lowe . |
| 4,718,547 | 1/1988 | MacTavish . |
| 4,759,442 | 7/1988 | Gregerson et al. ............ 206/387 |
| 4,760,914 | 8/1988 | Gelardi et al. ............ 206/387 X |
| 4,771,890 | 9/1988 | Holfland et al. . |
| 4,779,730 | 10/1988 | Hartsfield et al. . |
| 4,781,292 | 11/1988 | Sacherman et al. . |
| 4,805,769 | 2/1989 | Soltis et al. ............ 206/387 X |
| 4,815,600 | 3/1989 | Niles et al. . |
| 4,819,797 | 4/1989 | Holmgren ............ 206/387 X |
| 4,834,238 | 5/1989 | Hehn et al. ............ 206/387 |
| 4,850,477 | 7/1989 | Gelardi et al. ............ 206/309 X |
| 4,865,190 | 9/1989 | Gregerson et al. ............ 206/387 X |

FOREIGN PATENT DOCUMENTS 0112507  7/1984  European Pat. Off. ............ 206/387

Primary Examiner—Robert W. Gibson, Jr.
Attorney, Agent, or Firm—James Creighton Wray

[57] ABSTRACT

A thin, light-weight, one-piece rack package for disc record media storage cases holds compact discs in two types of double configurations, one as retailer, and the other as a rack. Eighteen compact disc boxes can be held in individual slots of the rack with longitudinal side walls and transverse end walls. The boxes are separated by dividers, which are spaced to allow the boxes to tip forwards or backwards, and have keepers and snaps to hold the discs in place.

27 Claims, 3 Drawing Sheets

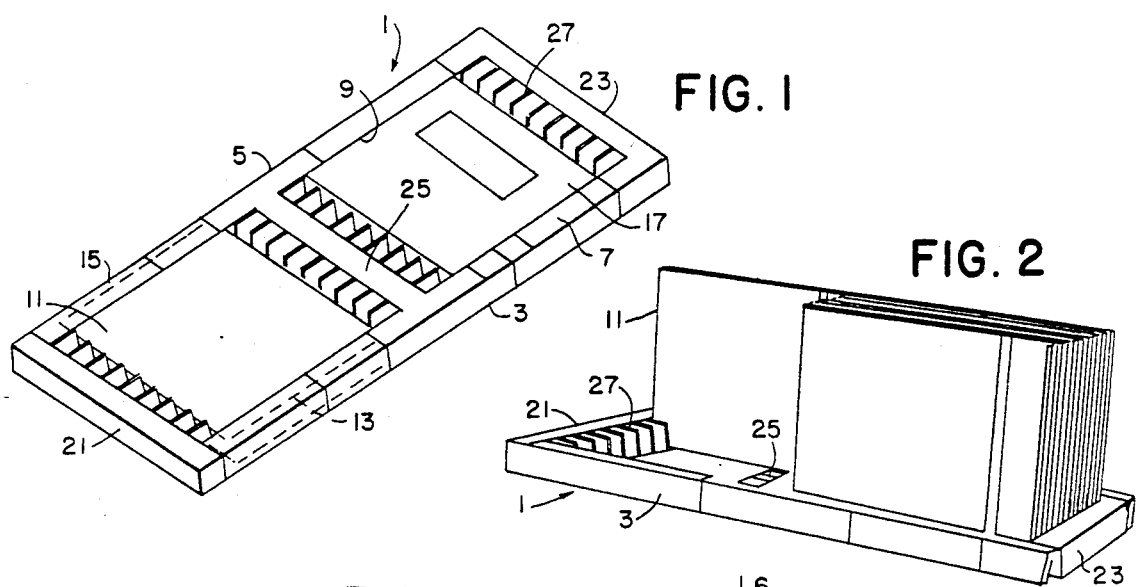
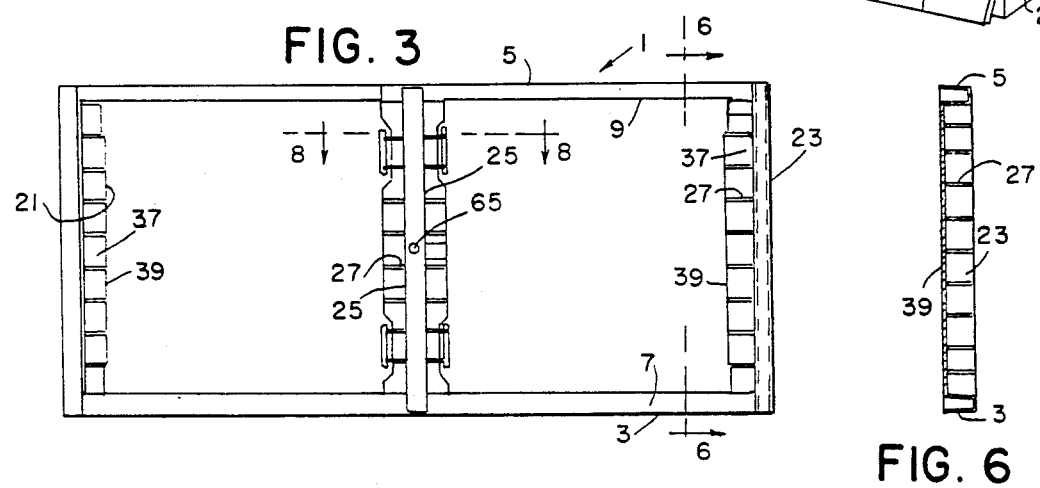
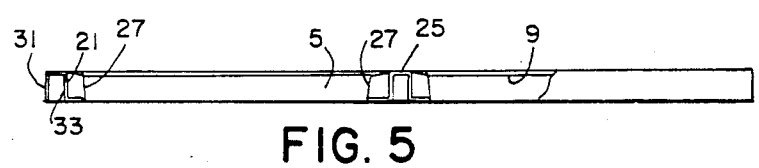
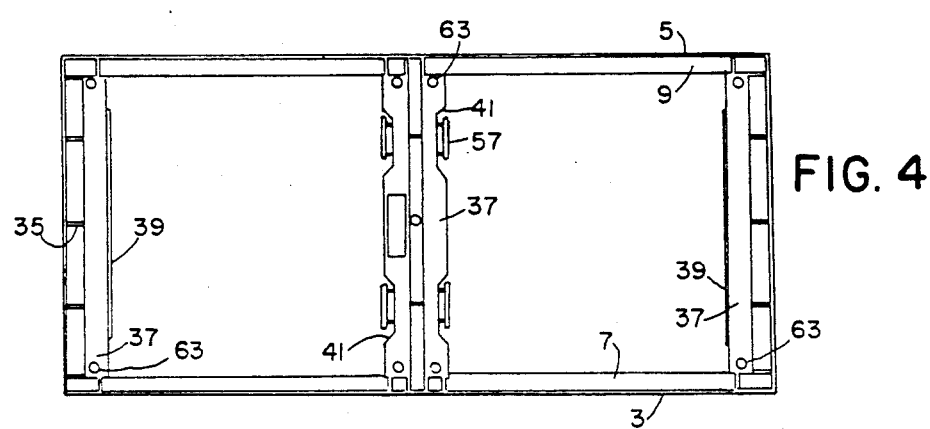

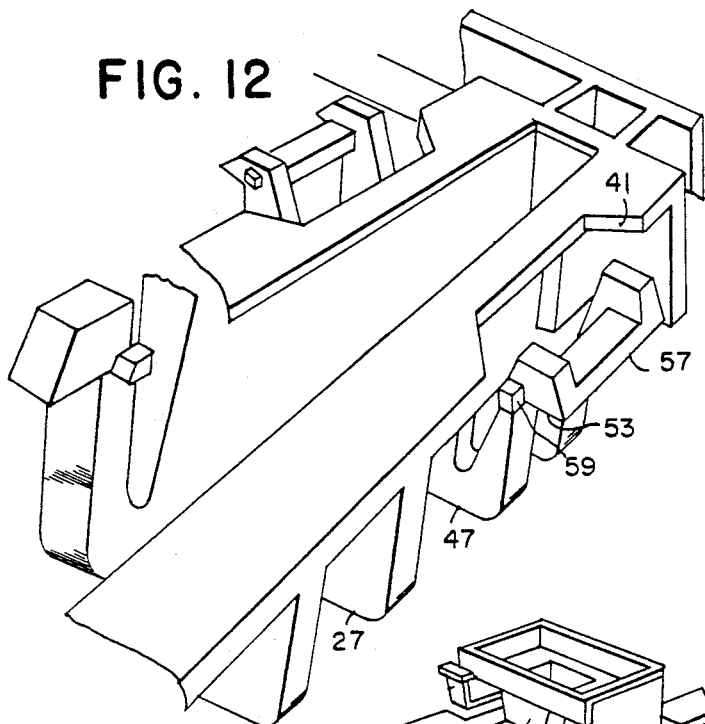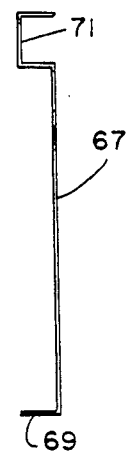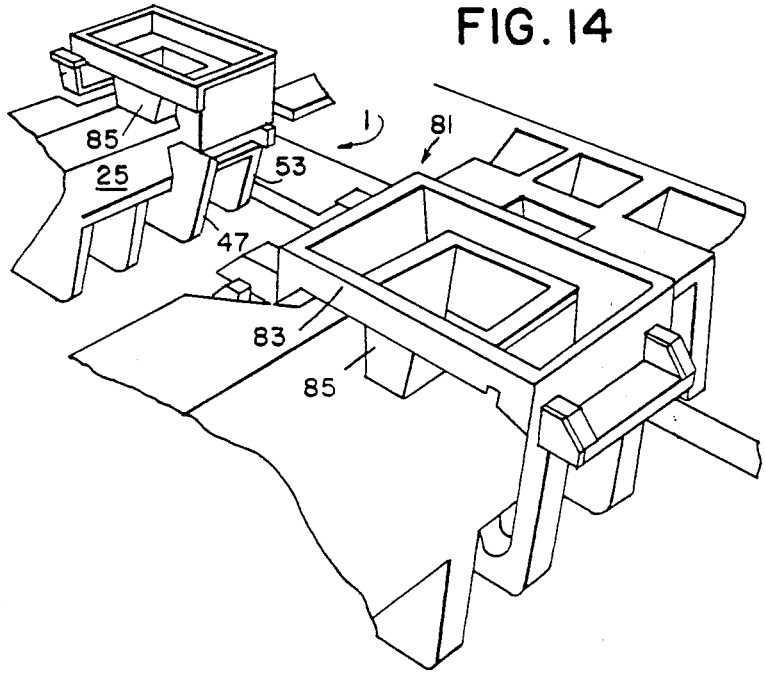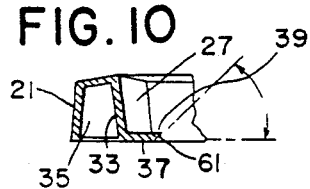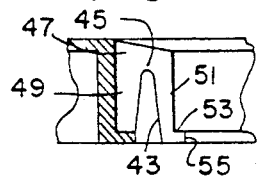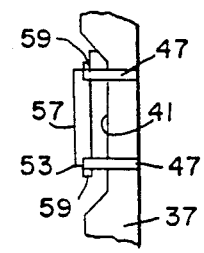

RACK PACKAGE

BACKGROUND OF THE INVENTION

Thin record media is often supplied in disc form. Discs have cases which are usually relatively rigid compared to the discs. Of primary interest are compact discs known as CD discs in which digital information is optically stored and which are read by machines often to reproduce music. The discs are usually stored in thin rigid plastic cases which have become standardized and which are known as Philip Jewel boxes. Other cases for discs such as the relatively rigid cardboard cases which hold magnetic recording media floppy discs or mini or micro magnetic discs in more rigid cases, or other records such as, for example, microfiche records in thin cases, or photographic or other records in thin cases or magnetic reel-stored tapes in thin cases may be employed.

Storage racks for such cases for record media are known. Some of the racks are intended to be used as packages for retailing the media in the cases.

Racks and packages of that nature have several drawbacks. For example, they increase thickness, weight and costs of the packages. Increased thickness and weight means increased shipping costs and fewer products within similar size containers, or larger, heavier containers for the same number of products. Packaging materials from which the rack packages are made eventually add to the burden of storage and landfill and thus add an additional economic burden. Rack packages of the prior art are either thick and cumbersome, uneconomic, or difficult to assemble or all three.

Other disadvantages of the prior art may be readily determined by reviewing the prior art which is cited in the present case.

SUMMARY OF THE INVENTION

The present invention overcomes and avoids problems of the prior art by providing a thin, lightweight, one-piece rack package in which products can be stored without adding appreciable weight or thickness due to packaging. The contents may be easily inserted when closing the package, and the package may be readily opened and converted to rack use with minimal steps.

The present invention provides a plastic CD retailer and CD case flip file. Most CD plastic retailers to date have been disposable without a use other than retailing. Most current flip file type storage systems do not act as anti-theft retailer, and some are made from six pieces. A current retailer-filing rack is made of several parts which must be fitted together before and after the contents are inserted.

The present CD rack is used for merchandising up to two compact discs in an anti-theft tamper-proof package, and also be used for a storage system holding up to 18 compact discs is standard Philip Jewel cases.

The CD storage rack is designed to hold compact discs in two types of configurations, one being as a retailer where the CD box is snapped into the rack's frame and the other being a rack, where cases are in upright positions in eighteen possible slots. In the retailer use, the CD box is held in place by two mechanical snaps and, opposite from the two snaps, a protruding bar. The CD box at the same time is enclosed by the side walls of the rack. These features are for preventing the theft of the compact disc and CD box. When used as an organizer, the rack has slots for up to eighteen compact disc boxes. These slots are recessed into the rack and are made up of two groups of nine slots running perpendicular to the axis of the length of the rack. The rack also has four details around the perimeter of the frame portion which are for use during automation as well as for appearance. These details can also be used to connect numbers of racks together.

The rack has a use after purchase as a storage system. It is one piece instead of having multiple sub components.

Preferably the rack is a molded one-piece plastic frame. It could also be a combination of elements.

The rack has eight stacking details on the bottom which are used for stacking and for lifting the frame of the rack from full contact with a flat surface. This is to prevent scuffing of the rack on surfaces and to prevent uneven contact of the bottom of the rack and surface and to permit lifting of a loaded rack from a surface. This detail of the eight buttons is used during automation as an alignment feature.

Snaps hold discs in place. On either side of the snaps are tab protrusion which are used during insertion of discs into racks. These features allow the snaps to be displaced back out of the way so that the CD box can be dropped into place. Opposite of the snaps is a bar which is also used to hold the CD box in place.

The present CD rack can hold up to two compact discs or one compact disc with graphic card for merchandising or 18 compact discs for storage. Preferably the CD rack is made of plastic.

Eighteen compact disc boxes are held in individual slots, the disc boxes are separated by dividers, which are spaced to allow the disc boxes to tip forward and backward for viewing labels and graphics on faces of individual boxes. The dividers also act as centering spacers when the compact disc retailer-storage rack is used as a retailer to prevent movement of a Jewel box during shipping and handling.

The invention provides rack apparatus for disk record media storage cases. An elongated frame has longitudinally extending side walls. Transverse end walls extending parallel to each other are connected between ends of the side walls. A transverse central wall extending parallel to the end walls is connected between centers of the side walls. The end walls have regularly spaced short inward dividers generally parallel to the side walls. The central wall has similar regularly spaced short, oppositely extending dividers extending toward the end walls parallel to the side walls. Extensions near the bottoms of the short protrusions form with the dividers, the transverse walls and the side walls, a rack for holding plural compact disc storage cases generally upright between the dividers.

Lips extend inward from upper edges of the side walls, and keepers extend inward near the extensions and beyond the dividers for holding a disc record media storage case between the sidewalls, the dividers, the lips and the keepers. The keepers include ledges extending inward from the extensions. Preferably the keepers further include snaps opposite the ledges for snapping and capturing a case above the ledges and snaps.

In a preferred form the snaps are formed from some of the protrusions in the central wall. Upward extending medial reliefs in plate-like protrusions form downward opening U-shaped springs with fixed legs attached to the central wall and free legs remote from the center wall. Inward extending tips on the bottoms of the free legs cooperate with the ledges to hold a rigid storage case for disc record media upward within the frame. Free legs of the springs urge the case toward opposite protrusions and urge the tips under the case.

Preferably springs are constructed from pairs of parallel protrusions as paired springs with parallel legs. A cross member extends between free ends of the free legs and extends toward the ledge for cooperating with the ledge to hold a rigid case in the frame.

End tabs or end projections on the cross members extend outward from the paired springs in the directions of the opposite side walls. Gripping the tab or projections and pressing the free legs of the springs toward the fixed legs of the springs facilitates inserting a rigid case within the frame.

Preferably a lower inward edge of the cross member is chamfered downwardly and outwardly to aid compression of the springs and insertion of a rigid case within the frame. Two springs connected by a cross member make a spring assembly. Two spring assemblies are mounted on each side of the center wall.

In a preferred embodiment, the bases or extensions are flanges extending from the transverse walls at bottoms of the dividers. The flanges cooperate with the walls and dividers for holding rigid cases for disc media upright in aligned condition when the frame is used as a disc case rack. Buttons have circular peripheries extended downward from outer faces of the flanges for supporting the frame above a surface on which the frame rests. Preferably the flanges extending from the central wall are recessed inwardly toward the side wall in areas of the keepers.

In a preferred embodiment, the transverse central wall and end walls have downward opening U-shaped profiles having spaced inside and outside surfaces generally sloping and diverging downwardly and outwardly.

In a preferred use of the invention, a disc record media storage case is mounted in a cavity between inner edges of the free legs of the springs and inner edges of the opposite dividers on one of the end walls. A preferred graphics information card having a flat center section, a downward folded inner section and a downward U-shaped reentrantly folded outer section is positioned between opposite springs and inward surfaces of the opposite end wall. An alternative graphics information card may have a flat central section lying beneath the lips and spanning the space between the dividers. Two parallel end sections bent downward at opposite ends of the flat central sections engage ends of the dividers and have edges resting on the keepers, anchoring the card within one of the Jewel box securing cavities.

In one embodiment, first and second disc record media rigid storage cases are positioned respectively between a first pair of springs on one side of the central wall and the inner surfaces of the dividers on one end wall and between a second pair of springs on the opposite side of the central wall and inner surfaces of the dividers on an opposite end wall.

The invention further provides clips having bases underlying portions of the central wall. Central sections of the clips extend into the central wall. End sections extend into the U-shaped cutouts between the fixed and free legs of the springs for holding the free legs outward from the fixed legs.

Two clips may be held together by a flat plate-like bar which underlies a back of the central wall to position the two clips properly to urge opposite spring assemblies apart in Jewel box holding condition.

In one preferred form of the invention, a storage rack has a rectangular frame having spaced side walls and transverse walls connected to the side walls. Series of dividers extend inward from the transverse walls. Flanges extend inward from the transverse walls beneath the dividers. The walls, the dividers and the flanges form a rack for holding thin information media storage containers in generally vertically aligned relationship. Lips extend inward from upper edges of the side walls, and keepers extend inward beyond the flanges for holding a media storage container between the side walls, between the inner surfaces of the series of dividers, and between the lips and the keepers.

The preferred keepers include a protruding ledge extending inward from an inner edge of the first flange on a first transverse wall and springs connected to the second or central transverse wall and extending inward therefrom, toward the ledge. The springs having snaps extending generally inward beyond an inward extension of the second flange.

Preferably the snaps have beveled bottoms for urging the snaps toward the second transverse wall as containers are pushed upward into the frame between the dividers and the side walls.

In one embodiment, clips extend across the second transverse wall and engage the snaps for preventing the snaps from moving toward the second wall to prevent passage of one end of a storage container. Paired clips are connected by a central bar.

These and further and other objects and features of the invention are apparent in the disclosure which includes the above and ongoing written description and claims and the drawings.

BRIEF DESCRIPTION OF THE DRAWINGS

FIG. 1 is a perspective view of a CD rack of the present invention used as a CD Jewel box retail package.

FIG. 2 is a perspective view of the CD rack of the present invention used as a rack for thin articles, namely, compact disc storage cases.

FIG. 3 top view of the rack package shown in FIGS. 1 and 2.

FIG. 4 is a bottom view of the rack package shown in FIGS. 1, 2 and 3.

FIG. 5 is a side elevation partially in section showing he rack package of FIGS. 1–4.

FIG. 6 sectional view taken along line 6—6 and FIG. 3.

FIG. 7 is a top view detail of a preferred Jewel box-capturing snap shown in FIGS. 3 and 4.

FIG. 8 is a detail of the center wall taken along line 8—8 of FIG. 3.

FIG. 9 is an enlarged sectional detail taken from FIG. 8.

FIG. 10 is a sectional detail showing the ledge taken along line 10—10 of FIG. 3.

FIG. 11 a side elevational detail of a folded graphic card shown in FIG. 1.

FIG. 12 is a bottom perspective view of the preferred springs snaps of the present invention.

FIG. 14 shows the clip inserted between opposite springs.

DETAILED DESCRIPTION

Figure 13:
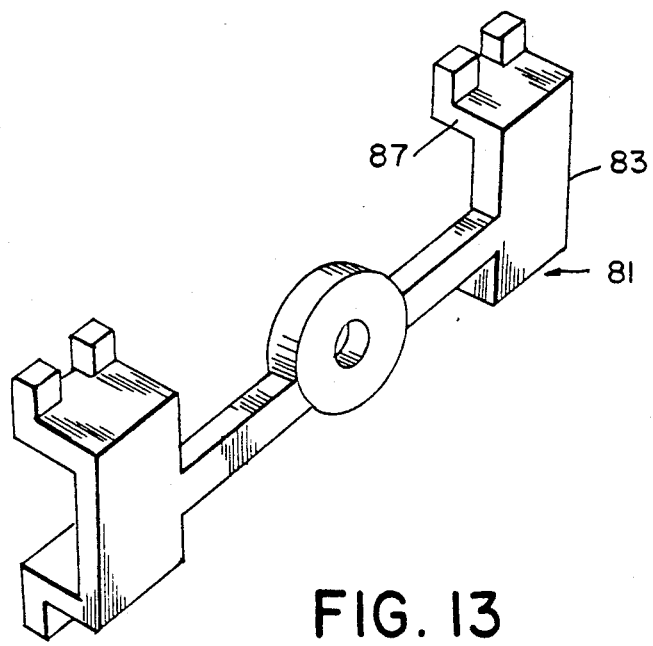
FIG. 13 shows a clip which may be inserted between fixed and free legs of the springs to hold the free legs outward and to hold the snap engaged with the case to hold the case in the cavity of the frame.

Referring to FIG. 1, a CD rack frame is generally indicated by the numeral 1. Frame 1 is integrally formed from plastic in die cavities having opposed preformed parts. Frame 1 has two opposite generally vertical thin side walls 3 and 5. Upper lips 7 and 9 extend inward from tops of the side walls 3 and 5. The lips 7 and 9 retain the record media case 11 within the frame 1 by overlying opposite ends 13 and 15 of the case. Case 11 is a conventional compact disc storage case also known as a Philip Jewel box. The extended lips 7 and 9 also hold within case 1 a graphics card 17 which preferably is a folded graphics card having dimensions similar to the CD case 11. Graphics card 17 may be replaced by a booklet or pamphlet or by an additional CD case 11.

Transverse walls 21, 23 and 25 have plural regularly spaced dividers 27 which extend from each transverse wall toward an opposite transverse wall. The dividers may take any suitable form, such as aligned pegs or the thin vane-like partitions as shown in the drawings, which are capable of performing two functions. One is centering the case 11 or card 17 between opposite transverse walls in cooperation with the side walls 3 and 5. The other function of the dividers is to hold plural thin wall cases upright, when frame 1 is used as a rack. Both functions of the dividers 27 which may be accomplished by thin vanes shown in the drawing or by rows of pegs or pins or by appropriately sized beads or by other protrusions.

In FIG. 2, plural storage cases 11 are held in generally vertical positions by the dividers 27, when the CD frame 1 is used as a storage rack. The dividers 27 are positioned at regular intervals along transverse walls and have spaces which are slightly larger than thicknesses of the cases 11, so that the cases may be tipped forward and rearward to read facial graphics, which describe the contents of the cases.

Referring to FIGS. 3, 4 and 5, the transverse walls 21, 23 and 25 have hollow forms, with outer and inner surfaces 31 and 33. As shown in the drawings, the surfaces are slightly sloped for withdrawal of the dies after molding. The hollow transverse walls are strengthened by vertical fillet webs 35.

Bases 37 extend under the dividers 27. The bases may take any form, for example, elongated rods extending under or between lower portions of the dividers or short rods extending laterally from the dividers or extending inward from the ends beneath the dividers. The extensions or bases support lower ledges of cases when the package is used as a CD rack as shown in FIG. 2. The base extensions also strengthen the dividers, allowing them to be made thinner.

Ledges 39 extend inward from the medial portions of the bases 37. The ledges 39 have the purpose of holding side edge of the case 11 or graphics card 17 upward within the frame, when used as a retail package. The ledges may take any form which is appropriate to that function. For example, the ledges may be spaced beads or individual inward ledges extended inward from lower portions of the dividers 27.

Portions 41 of the bases 37 are relieved inward near opposite ends of the center transverse wall 25.

As best shown in FIGS. 7, 8 and 9, some of the plate-like dividers 27 which extend from the center wall have reliefs 43 in medial portions 45 to form split, downward-opening, U-shaped springs 47. The springs have two legs. Inner legs 49 are fixed to the center wall, and free legs 51 are cantilevered from upper ends of the fixed legs. The free legs 51 have tips or snaps 53 at the bottoms, which override and engage an end of a case as it is pressed upward beyond the bevel 55 and snapped into the frame 1. As shown in FIG. 7, the snaps 53 are preferably made as bars 57 which extend between adjacent free legs 51 of springs 47. Projections 59 extend outward beyond the ends of bar 57. Engaging the projections and moving bar 57 toward the recess 41 in the base 37 allows a case to be pressed into the frame.

As shown in the detail of FIG. 10, ledge 39 extends outward from base 37. Ledge 39 has a beveled lower surface 61 in a preferred embodiment.

As shown in FIG. 4, the bases 37 have small circular peripheral downward projections or buttons 63 formed near ends thereof. The downward extending buttons have two functions. One is to hold the frame, and consequently the case within the frame, above a surface on which it rests. The buttons 63 have the additional function of aligning stacked racks by innerfitting in corners of the junctions of the upper lips 7 and 9 and the transverse walls when stacking the frames. A recessed guide 65 is positioned in the center of the central transverse wall 25.

As best seen in FIG. 9, a thin CD storage case is held within the frame above the base at a distance substantially equal to the thickness of snap 53, which roughly coincides with the thickness of the bases 37. The case is held downward from the upper surface of the frame by a distance which corresponds with the thickness of the lips. Thus, surfaces of the case are protected from damage during handling. The distance of a storage case above a supporting surface is further increased by the thickness of the buttons 63. The storage rack adds very little to the thickness of a CD box during use as a retail package. Thus, the storage rack does not add costs in shipping, storage or displaying.

While the preferred snaps are shown in the drawing, other forms of snaps may be used. For example, the snaps may be formed as opposed resilient beads or ledges or portions thereof. The ledges 39 may be replaced by other devices including snaps similar to the snaps 53, and springs 47 may be provided in place of some of the dividers 27 on transverse end walls 21 and 23.

The preferred form of the frame is double, as shown in the drawings. The second cavity within the frame may be used to hold a similar case or may be used to hold the graphics card 17 or a booklet.

One preferred graphic card 17 is shown in FIG. 11. The graphic card 17 has a facial area 67, a downward folded end 69 and a reentrantly folded top 71. An alternate card may have a simple U-shaped cross section. When folded, the overall dimensions of the card are approximately the same as the overall dimensions of a storage case held within the frame. The frame of the invention may be made with a single cavity for receiving a storage case or may be made with multiple cavities. The preferred embodiment has two cavities as shown in the drawings.

The positioning of the case aligning dividers on the transverse walls as shown in the drawing is the preferred form of the invention, since it tends to provide the least overall size, the walls may be exchanged, for example, simply by considering the device divided medially and reassembled with one cavity aligned with the other. In that embodiment, the walls having the dividers would be the longer walls. The walls having the dividers would be referred to as transverse walls and the walls without the dividers would be referred to an side walls for purposes of consistency and understanding of the invention.

Of importance of the invention is the maintaining the thickness of the frame only slightly greater than a thickness of a case which the frame holds. In the present invention, that is accomplished while still providing a storage rack having sufficient depth to hold plural cases aligned and to permit forward and rearward tipping of the cases for seeing the faces of the cases when selecting, removing and replacing cases from the frame.

FIG. 12 is a bottom perspective view of the preferred springs and snaps of the present invention. FIG. 13 shows a clip which may be inserted between fixed and free legs of the springs to hold the free legs outward and to hold the snap engaged with the case to hold the case in the cavity of the frame. FIG. 14 shows the clip inserted in the springs. An alternate clip may be constructed with two joined sections.

Referring to FIG. 13 after the case has been inserted in the cavity of the frame, two clips 81 are inserted between opposite pairs of springs. Each clip has a body 83 and a projection 85, which extends into the inner space of wall 25. Spring holding projections 87 fit into the recesses between legs of springs 47 and hold the spring legs apart, urging the free legs 43 outward so that snaps 53 hold the storage case within the frame. Friction between the center portion 85 of the clip 81 and the inner surfaces of center transverse wall 25 holds the clip engaged with the spring.

Two clips 81 are held together by a central bar 89 which facilitates the positioning and removal of the clips.

We claim:

1. Rack apparatus formed entirely as a single piece for disc record media storage cases and comprising a one-piece elongated frame having longitudinally extending parallel side walls, transverse end walls extending parallel to each other and fixedly connected between ends of the side walls and a transverse central wall extending parallel to the end walls and fixedly connected between centers of the side walls, the end walls having similar regularly spaced short, oppositely extending dividers extending toward the end walls parallel to the side walls, bases extending near the bottom of the short dividers, and forming with the dividers, the transverse walls and the side walls, a compact disc storage case rack for holding plural compact disc storage cases generally upright between the dividers parallel to the side walls; and lips fixedly connected to and extending inward from the entire length of the upper edges of the side walls and keepers integrally formed in the dividers extending inward near the bases and beyond the reach of the dividers for holding a disc record media storage case between the side walls, the dividers, the lips and the keepers in a generally horizontal orientation.

2. The apparatus of claim 1 wherein the keepers comprise ledges extending inward from the bases.

3. The apparatus of claim 2 wherein the keepers further comprise snaps opposite the ledges for snapping and capturing a case above the ledges and snaps.

4. The apparatus of claim 2 wherein the keepers further comprise some of the dividers in the central wall having upward extending medial reliefs, thereby forming downward opening U-shaped springs, with fixed legs adjacent the central wall and free legs remote from the central wall, and further comprising inward extending tips on the bottoms of the free legs for cooperating with the ledges to hold rigid cases for disc record media upward within the frame, with free legs of the springs urging the tips under the case.

5. Rack apparatus for disk record media storage cases comprising an elongated frame having longitudinally extending side walls, transverse end walls extending parallel to each other and connected between ends of the side walls and a transverse central wall extending parallel to the end walls and connected between centers of the side walls, the end walls having regularly spaced short inward dividers generally parallel to the side walls and the central wall having similar regularly spaced short, oppositely extending dividers extending toward the end walls parallel to the side walls, bases extending near the bottoms of the short dividers, and forming with the dividers, the transverse walls and the side walls, a compact disc storage case rack for holding plural compact disc storage cases generally upright between the dividers, further comprising lips extending inward from upper edges of the side walls and keepers extending inward near the bases and beyond the dividers for holding a disc record media storage case between the sidewalls, the dividers, the lips and the keepers, wherein the keepers comprise ledges extending inward from the bases, wherein the keepers further comprise some of the dividers in the central wall having upward extending medial reliefs, thereby forming downward opening U-shaped springs, with fixed legs adjacent the central wall and free legs remote from the central wall, and further comprising inward extending tips on the bottoms of the free legs for cooperating with the ledges to hold rigid cases for disc record media upward within the frame, with free legs of the springs urging the tips under the case, wherein the springs are constructed form pairs of parallel dividers as paired springs with parallel legs, and wherein a cross member extends between free ends of the free legs and extends toward the ledge for cooperating with the ledge to hold the rigid case.

6. The apparatus of claim 5 further comprising end projections on the cross member extending outward from the paired springs in the directions of the opposite side walls for gripping the projections and pressing the free legs of the springs toward the fixed legs of the springs when inserting a rigid case within the frame.

7. The apparatus of claim 6 wherein a lower inward edge of the cross member is chamfered downwardly and outwardly to aid compression of the springs and insertion of a rigid case within the frame.

8. Rack apparatus for disk record media storage media storage cases comprising an elongated frame having longitudinally extending side walls, transverse end walls extending parallel to each other and connected between ends of the side walls and a transverse central wall extending parallel to the end walls and connected between centers of the side walls, the end walls having regularly spaced short inward dividers generally parallel to the side walls and the central wall having similar regularly spaced short, oppositely extending dividers extending toward the end walls parallel to the side walls, bases extending near the bottoms of the short dividers, and forming with the dividers, the transverse walls and the side walls, a compact disc storage case rack for holding plural compact disc storage cases generally upright between the dividers, further comprising lips extending inward from upper edges of the side walls and keepers extending inward near the bases and beyond the dividers for holding a disc record media storage case between the sidewalls, the dividers, the lips and the keepers, wherein the keepers comprise ledges extending inward from the bases, wherein the keepers further comprise some of the dividers in the central wall having upward extending medial reliefs, thereby forming downward opening U-shaped springs, with fixed legs adjacent the central wall and free legs remote from the central wall, and further comprising inward extending tips on the bottoms of the free legs for cooperating with the ledges to hold rigid cases for disc record media upward within the frame, with free legs of the springs urging the tips under the case, wherein two springs connected by a cross member comprise a spring assembly, and wherein first and second spring assemblies are mounted on each side of the central wall.

9. The apparatus of claim 1 wherein the bases comprise flanges extending from the transverse walls at bottoms of the dividers, the flanges cooperating with the walls and dividers for supporting rigid cases for disc media upright in aligned conditions, when the frame is used as a CD rack.

10. The apparatus of claim 9 further comprising buttons extended from outer faces of the flanges for supporting the frame above a surface on which the frame rests.

11. Rack apparatus for disk record media storage cases comprising an elongated frame having longitudinally extending the side walls, transverse end walls extending parallel to each other and connected between ends of the side walls and a transverse central wall extending parallel to the end walls and connected between centers of the side walls, the end walls having regularly spaced short inward dividers generally parallel to the side walls and the central wall having similar regularly spaced short, oppositely extending dividers extending toward the end walls parallel to the side walls, bases extending near the bottoms of the short dividers, and forming with the dividers, the transverse walls and the side walls, a compact disc storage case rack for holding plural compact disc storage cases generally upright between the dividers, further comprising lips extending inward from upper edges of the side walls and keepers extending inward near the bases and beyond the dividers for holding a disc record media storage case between the sidewalls, the dividers, the lips and the keepers, wherein the bases comprise flanges extending from the transverse walls at bottoms of the dividers, the flanges cooperating with the walls and dividers for supporting rigid cases for disc media upright in aligned conditions, when the frame is used as a CD rack, wherein the flanges extending from the central wall are recessed inwardly toward the side wall in an area of the keepers.

12. The apparatus of claim 1 wherein the transverse central wall and end walls have downward opening U-shaped profiles having spaced inside and outside surfaces generally sloping and diverging downwardly and outwardly.

13. The apparatus of claim 12 further comprising support webs positioned in the walls between the inside surfaces.

14. The apparatus of claim 1 further comprising downward extending buttons formed on under surfaces of the frame for spacing the frame from a surface on which it rests.

15. The apparatus of claim 1 wherein the dividers comprise plates having downward and inward sloping inner edges and wherein some of the plates have downward opening U-shaped cutouts and comprise springs with fixed and free legs, the free legs of the springs extending toward opposite dividers.

16. The apparatus of claim 15 further comprising a disc record media storage case mounted between inner edges of the free legs of the springs and inner edges of the opposite dividers on one of the end walls and a graphics information card having a flat center section, a downward folded inner section and a downward folded outer section positioned between opposite springs and inward surfaces of the opposite end wall.

17. The apparatus of claim 15 further comprising first and second disc record media rigid storage cases respectively between a first pair of springs on one side of the central wall and the inner surfaces of the dividers on one end wall and between a second pair of springs on the opposite side of the central wall and inner surfaces of the dividers on an opposite end wall.

18. The apparatus of claim 17 wherein the transverse central wall and end walls have downward opening U-shaped profiles having spaced inside and outside surfaces generally sloping and diverging downwardly and outwardly.

19. Rack apparatus for disk record media storage cases comprising an elongated frame having longitudinally extending side walls, transverse end walls extending parallel to each other and connected between ends of the side walls and a transverse central wall extending parallel to the end walls and connected between centers of the side walls, the end walls having regularly spaced short inward dividers generally parallel to the side walls and the central wall having similar regularly spaced short, oppositely extending dividers extending toward the end walls parallel to the side walls, bases extending near the bottoms of the short dividers, and forming with the dividers, the transverse walls and the side walls, a compact disc storage case rack for holding plural compact disc storage cases generally upright between the dividers, wherein the dividers comprise plates having downward and inward sloping inner edges and wherein some of the plates have downward opening U-shaped cutouts and comprise springs with fixed and free legs, the free legs of the springs extending toward opposite dividers, further comprising first and second disc record media rigid storage cases respectively between a first pair of springs on one side of the central wall and the inner surfaces of the dividers on one end wall and between a second pair of springs on the opposite side of the central wall and inner surfaces of the dividers on an opposite end wall, therein the transverse central wall and end walls have downward opening U-shaped profiles having spaced inside and outside surfaces generally sloping and diverging downwardly and outwardly, further comprising clips having bases underlying portions of the central wall, having central sections extending into the central wall and having end sections extending into the U-shaped cutouts between the fixed and free legs of the springs for holding the free legs outward from the fixed legs.

20. Rack apparatus for disk record media storage cases comprising an elongated frame having longitudinally extending side walls, transverse end walls extending parallel to each other and connected between ends of the side walls and a transverse central wall extending parallel to the end walls and connected between centers of the side walls, the end walls having regularly spaced short inward dividers generally parallel to the side walls and the central wall having similar regularly spaced short, oppositely extending dividers extending toward the end walls parallel to the side walls, bases extending near the bottoms of the short dividers, and forming with the dividers, the transverse walls and the side walls, a compact disc storage case rack for holding plural compact disc storage cases generally upright between the dividers, wherein the dividers comprise plates having downward and inward sloping inner edges and wherein some of the plates have downward opening U-shaped cutouts and comprise springs with fixed and free legs, the free legs of the springs extending toward opposite dividers, further comprising case-retaining lips extending inward from upper edges of the side walls.

21. A storage rack formed entirely as a single piece and comprising a one-piece rectangular frame having first and second parallel spaced side walls and first and second parallel spaced transverse walls fixedly connected to the side walls, a central wall parallel to the transverse walls and fixedly connected to the side walls, first and second series of dividers extending inward from the transverse walls and first and second bases extending respectively beneath the first and second series of dividers, a pair of series of dividers extending from the central wall opposite and towards the first and second series of dividers from the transverse walls, the walls, the dividers and the bases forming a rack for holding thin information media storage containers in generally vertically aligned relationship, first and second keepers integrally formed in the dividers and extending inward beyond the bases, and first and second lips fixedly connected to and extending inward from the entire length of the upper edges of the first and second side walls, for holding a media storage container between the first and second side walls, between the inner surface of the series of dividers, and between the lips and the keepers in a generally horizontal orientation.

22. The apparatus of claim 21 wherein the first and second keepers respectively comprise a protruding ledge extending inward from an inner edge of the first base and springs connected to the second transverse wall and extending inward therefrom, toward the ledge, the springs having snaps extending generally inward beyond an inward extension of the second base.

23. The apparatus of claim 21 wherein the first and second side walls extend beyond the second transverse wall and further comprising a third transverse wall connected to extended ends of the first and second side walls, third and fourth series of dividers and third and fourth bases which are similar to the first and second series of dividers and the first and second bases extend inward toward each other from the second and third transverse walls, third and fourth lips similar to the first and second lips extending inward from upper edges of the extended first and second side walls toward the third and fourth series of dividers and further comprising third and fourth keepers extending inward respectively beyond the third and fourth bases.

24. The apparatus of claim 23 wherein the first and fourth keepers comprise bars extending inward from the first and fourth bases and wherein the second and third keepers comprise snaps.

25. The apparatus of claim 24 wherein the snaps have beveled bottoms for urging the snaps toward the second transverse wall as containers are pushed upward into the frame between the dividers and the side walls.

26. A storage rack comprising a rectangular frame having first and second parallel spaced side walls and first and second parallel spaced transverse walls connected to the side walls, first and second series of dividers extending inward from the transverse walls and first and second bases extending respectively beneath the first and second series of dividers, the walls, the dividers and the bases forming a rack for holding thin information media storage containers in generally vertically aligned relationship, first and second keepers extending inward beyond the bases, and first and second lips extending inward beyond the bases, and first and second lips extending inward from upper edges of the first and second side walls, for holding a media storage container between the first and second side walls, between the inner surfaces of the series of dividers, and between the lips and the keepers, wherein the first and second side walls extend beyond the second transverse wall and further comprising a third transverse wall connected to extended ends of the first and second side walls, third and fourth series of dividers and third and fourth bases which are similar to the first and second series of dividers and the first and second bases extend inward toward each other from the second and third transverse walls, third and fourth lips similar to the first and second lips extending inward from upper edges of the extended first and second side walls toward the third and fourth series of dividers and further comprising third and fourth keepers extending inward respectively beyond the third and fourth bases, wherein the first and fourth keepers comprise bars extending inward from the first and fourth bases and wherein the second and third keepers comprise snaps, wherein the snaps have beveled bottoms for urging the snaps toward the second transverse wall as containers are pushed upward into the frame between the dividers and the side walls, further comprising clips extending across the second transverse walls and engaging the snaps for preventing the snaps from moving toward the second wall to accommodate passage of one end of a storage case.

27. A storage rack comprising a rectangular frame having first and second parallel spaced side walls and first and second parallel spaced transverse walls connected to the side walls, first and second series of dividers extending inward from the transverse walls and first an d second bases extending respectively beneath the first and second series of dividers, the walls, the dividers and the bases forming a rack for holding thin information media storage containers in generally vertically aligned relationship, first and second keepers extending inward beyond the bases, and first and second lips extending inward beyond the bases, and first and second lips extending inward from upper edges of the first and second side walls, for holding a media storage container between the first and second side walls, between the inner surfaces of the series of dividers, and between the lips and the keepers, wherein the first and second side walls extend beyond the second transverse wall and further comprising a third transverse wall connected to extended ends of the first and second side walls, third and fourth series of dividers and third and fourth bases which are similar to the first and second series of dividers and the first and second bases extend inward toward each other from the second and third transverse walls, third and fourth lips similar to the first and second lips extending inward from upper edges of the extended first and second side walls toward the third and fourth series of dividers and further comprising third and fourth keepers extending inward respectively beyond the third and fourth bases, wherein the first and fourth keepers comprise bars extending inward from the first and fourth bases and wherein the second and third keepers comprise snaps, further comprising clips extending across the second transverse walls and engaging the snaps for preventing the snaps from moving toward the second wall to accommodate passage of one end of a storage case.

* * * * *